R. C. BERRY.
HACKSAW GUIDE.
APPLICATION FILED JULY 13, 1912.
1,091,726.
Patented Mar. 31, 1914.
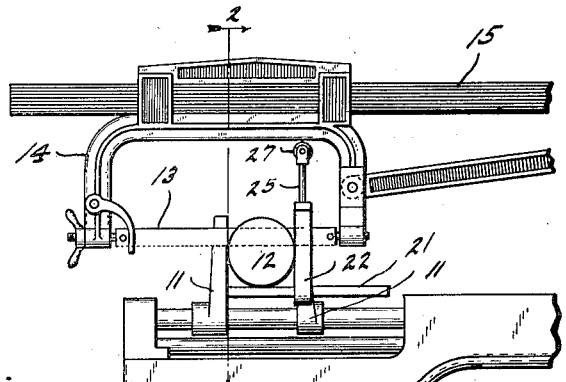
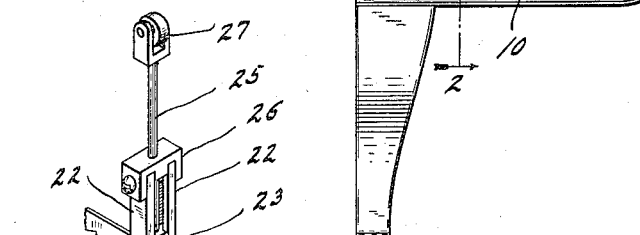
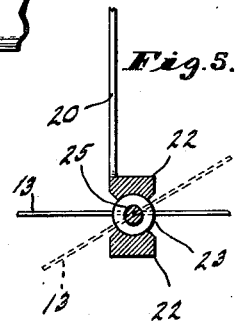
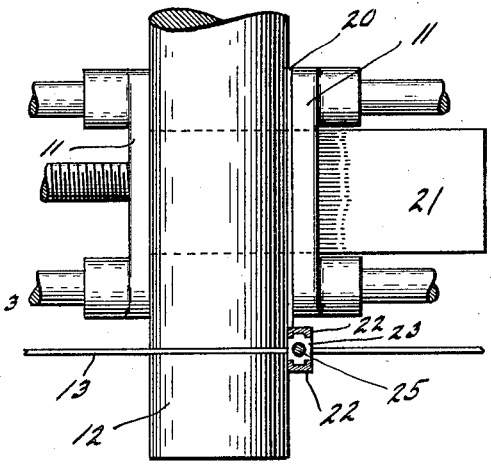
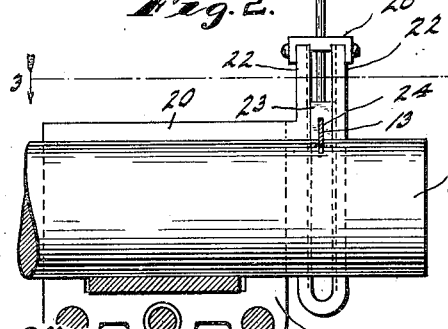
Witnesses
Frank A. Sahle
Josephine Gasper
Inventor
Robert C. Berry,
By Arthur M. Hood.
Attorney

UNITED STATES PATENT OFFICE.

ROBERT C. BERRY, OF INDIANAPOLIS, INDIANA.

HACKSAW-GUIDE.

1,091,726.   Specification of Letters Patent.   Patented Mar. 31, 1914.

Application filed July 13, 1912. Serial No. 709,247.

*To all whom it may concern:*

Be it known that I, ROBERT C. BERRY, a citizen of the United States, residing at Indianapolis, in the county of Marion and State of Indiana, have invented a new and useful Hacksaw-Guide, of which the following is a specification.

In the operation of hack saws it is found that there is often a decided tendency for the hack saw to swerve from the desired course, and thus make a crooked cut. This may be due to an inequality in the setting of the teeth on the two sides of the saw, or to an inequality in tempering resulting in unequal wear on the teeth set toward the two sides of the saw.

It is the object of my present invention to hold the saw to its course. This is accomplished by providing a guide which embraces the saw blade close to the work and is mounted in guide-ways so that it can travel in a direction transverse to the length of the saw blade, the guide-ways being mounted on a plate which can be clamped between the work and the vise jaws. The guide and guide-ways are preferably so constructed that the guide may be turned to different angles in the guide-ways, to allow oblique saw cuts. The guide is preferably provided with a projection carrying a roller which coöperates with the lower surface of the top of the saw frame to feed the guide positively as the cut deepens.

The accompanying drawings illustrate my invention.

In these drawings, Figure 1 is a fragmentary elevation of a machine hack saw embodying my invention; Fig. 2 an enlarged section on the line 2—2 of Fig. 1; Fig. 3 a section on the line 3—3 of Fig. 2; Fig. 4 a perspective view of the saw guide and its coöperating parts; and Fig. 5 a cross sectional view showing a modified form of guide and guide-way which allow swiveling of the guide.

The main frame 10 of the machine is provided with vise jaws 11 for holding the work 12 in position to be sawed by the saw blade 13 carried by the saw frame 14 reciprocably mounted on the slide 15. A plate 20 may be clamped between one of the vise jaws 11 and the work 12, said plate 20 resting on the base plate 21 of the vise. The plate 20 is provided at one end with two vertical arms 22 which form a guide-way for a guide 23. The guide 23 may fit in the guide-way 22 either so that it can slide therein but cannot turn therein, as shown in Fig. 3, or so that it can both slide and swivel therein, as shown in Fig. 5. The latter arrangement has the advantage of allowing an oblique cut to be made, when desired. The guide 23 is provided with a vertical slot 24 extending upwardly from its bottom edge, such slot being of proper size to have a sliding fit over the back edge and sides of the saw blade 13. A rod 25 projects upwardly from the guide 23, through the cap 26 which may be provided for bracing the upper ends of the arms 22, and is provided at its upper end with a roller 27 which is in the same plane with and just below the lower edge of the horizontal part of the saw frame 14.

In operation, the guide 23 is placed over the saw 13 and then the work 12 and plate 20 are clamped between the vise jaws 11. Then the saw frame 12 is started to reciprocate. The guide 23 holds the saw 13 accurately to its course and slides down in the guide-ways 23 as the saw cut deepens. In case the guide 23 fails to slide down by gravity as the saw 13 descends, the saw frame 14 engages the roller 27 and forces it, and through it the guide 23, downward with the saw.

I claim as my invention:

1. The combination with the main frame, vise jaws, and reciprocating saw frame of a machine hack saw, of a guide which is adapted to fit over the back of the saw, a guide-way in which said guide is slidably and rotatably mounted, a plate carrying said guide-way and adapted to be clamped between the work and one of the vise jaws, and a projection from said guide provided at its upper end with a roller coöperating with the under side of the saw frame to feed the guide positively as the saw cut deepens.

2. The combination with the main frame, vise jaws, and reciprocating saw frame of a machine hack saw, of a guide which is adapted to fit over the back of the saw, a guide-way in which said guide is slidably mounted, a plate carrying said guide-way and adapted to be clamped between the work and one of the vise jaws, and a projection from said guide provided at its upper end with a roller coöperating with the under side of the saw frame to feed the guide positively as the saw cut deepens.

3. The combination with the main frame, vise jaws, and reciprocating saw frame of a machine hack saw, of a guide which is adapted to fit over the back of the saw, a guide-way in which said guide is slidably and rotatably mounted, and a plate carrying said guide-way and adapted to be clamped between the work and one of the vise jaws.

4. The combination with the main frame, vise jaws, and reciprocating saw frame of a machine hack saw, of a guide which is adapted to fit over the back of the saw, a guide-way in which said guide is slidably mounted, and a plate carrying said guide-way and adapted to be clamped between the work and one of the vise jaws.

5. The combination with the main frame, vise jaws, and reciprocating saw frame of a machine hack saw, of a guide which is adapted to fit over the back of the saw, a guide-way in which said guide is slidably and rotatably mounted, a plate carrying said guide-way and adapted to be clamped between the work and one of the vise jaws, and a projection from said guide coöperating with the under side of the saw frame to feed the guide positively as the saw cut deepens.

6. The combination with the main frame, vise jaws, and reciprocating saw frame of a machine hack saw, of a guide which is adapted to fit over the back of the saw, a guide-way in which said guide is slidably mounted, a plate carrying said guide-way and adapted to be clamped between the work and one of the vise jaws, and a projection from said guide coöperating with the under side of the saw frame to feed the guide positively as the saw cut deepens.

7. The combination with the main frame, vise jaws, and reciprocating saw frame of a machine hack saw, said saw-frame being provided with holding means for both ends of a saw-blade and reciprocating as a unit therewith, of a guide adapted to fit over the back edge and sides of the saw, a guide-way in which said guide is slidable, and means coöperating with the saw frame for feeding said guide along said guide-way as the saw cut deepens.

8. The combination with the main frame, vise jaws, and reciprocating saw frame of a machine hack saw, said saw-frame being provided with holding means for both ends of a saw-blade and reciprocating as a unit therewith, of a guide adapted to fit over the back edge and sides of the saw, and a rectilinear guide-way in which said guide is slidable.

9. As an article of manufacture, a guiding attachment for hack saws, comprising a guide adapted to fit over the back edge and sides of the saw, a guide-way in which said guide is slidable and rotatable, a plate carrying said guide-way and adapted to be clamped in a vise with the material to be sawed, and a projection from said guide adapted to coöperate with the saw frame for feeding the guide along the guide-way as the saw cut deepens.

10. As an article of manufacture, a guiding attachment for hack saws, comprising a guide adapted to fit over the back edge and sides of the saw, a guide-way in which said guide is slidable, a plate carrying said guide-way and adapted to be clamped in a vise with the material to be sawed, and a projection from said guide adapted to coöperate with the main frame for feeding the guide along the guide-way as the saw cut deepens.

11. As an article of manufacture, a guiding attachment for hack saws, comprising a guide adapted to fit over the back edge and sides of the saw, a guide-way in which said guide is slidable and rotatable, and a plate carrying said guide-way and adapted to be clamped in a vise with the material to be sawed.

12. As an article of manufacture, a guiding attachment for hack saws, comprising a guide adapted to fit over the back edge and sides of the saw, a guide-way in which said guide is slidable, and a plate carrying said guide-way and adapted to be clamped in a vise with the material to be sawed.

13. As an article of manufacture, a guiding attachment for hack saws, comprising a guide adapted to fit over the back edge and sides of the saw, a guide-way in which said guide is slidable, and a plate carrying said guide-way and so located relatively thereto that when clamped in the saw vise with the work it supports the guide and guide-way in proper position relative to the saw.

14. As an article of manufacture, a guiding attachment for hack saws, comprising a guide adapted to fit over the back edge and sides of the saw, a guide-way in which said guide is slidable, and a plate carrying said guide-way and so located relatively thereto that when clamped in the saw vise with the work it supports the guide and guide-way in proper position relative to the saw, and a projection from said guide adapted to coöperate with the saw frame for feeding the guide along the guide-way as the saw cut deepens.

In witness whereof, I have hereunto set my hand and seal at Indianapolis, Indiana, this 10th day of July, A. D. one thousand nine hundred and twelve.

ROBERT C. BERRY. [L. S.]

Witnesses:
ARTHUR M. HOOD,
G. B. SCHLEY.